United States Patent
Nunes et al.

(10) Patent No.: US 8,643,995 B2
(45) Date of Patent: Feb. 4, 2014

(54) METHOD AND A DEVICE FOR OVERVOLTAGE PROTECTION, AND AN ELECTRIC SYSTEM WITH SUCH A DEVICE

(75) Inventors: Jose Nunes, Ludvika (SE); Jonas Karlsson, Ludvika (SE)

(73) Assignee: ABB Technology AG, Zurich (CH)

( * ) Notice: Subject to any disclaimer, the term of this patent is extended or adjusted under 35 U.S.C. 154(b) by 81 days.

(21) Appl. No.: 13/392,913

(22) PCT Filed: Aug. 31, 2009

(86) PCT No.: PCT/EP2009/061214
§ 371 (c)(1),
(2), (4) Date: May 14, 2012

(87) PCT Pub. No.: WO2011/023238
PCT Pub. Date: Mar. 3, 2011

(65) Prior Publication Data
US 2012/0218672 A1    Aug. 30, 2012

(51) Int. Cl.
*H02H 3/22*    (2006.01)

(52) U.S. Cl.
USPC ............................................. 361/111

(58) Field of Classification Search
USPC ............................................. 361/111
See application file for complete search history.

(56) References Cited

U.S. PATENT DOCUMENTS

| | | | |
|---|---|---|---|
| 4,695,916 A * | 9/1987 | Satoh et al. | 361/56 |
| 6,239,514 B1 * | 5/2001 | Isberg et al. | 307/116 |
| 6,291,952 B1 * | 9/2001 | Roth-Stielow et al. | 318/375 |
| 6,351,126 B1 * | 2/2002 | Belew et al. | 324/326 |
| 6,459,559 B1 | 10/2002 | Christofersen | |
| 7,430,101 B2 * | 9/2008 | Komulainen et al. | 361/111 |
| 2005/0280972 A1 * | 12/2005 | Jonsson | 361/111 |
| 2006/0001497 A1 * | 1/2006 | Minteer | 331/139 |
| 2011/0102056 A1 * | 5/2011 | Brueckl et al. | 327/478 |

FOREIGN PATENT DOCUMENTS

| | | |
|---|---|---|
| DE | 1 513 491 A1 | 12/1969 |
| DE | 196 23 541 A1 | 12/1997 |
| EP | 0 462 694 A2 | 12/1991 |
| WO | WO 97/48159 A1 | 12/1997 |
| WO | WO 02/50972 A1 | 6/2002 |
| WO | WO 2008-131799 A1 | 11/2008 |
| WO | WO 2009-149744 A1 | 12/2009 |

* cited by examiner

*Primary Examiner* — Scott Bauer
(74) *Attorney, Agent, or Firm* — Birch, Stewart, Kolasch & Birch, LLP

(57) ABSTRACT

A method and device for protecting an electric system against overvoltage occurrences, the electric system being adapted to be subjected to voltages. The device includes a plurality of surge arresters and a detector configured to detect overvoltage occurrences in the electric system. The surge arresters are connected in series, the plurality of surge arresters including a first surge arrester which is connectable to ground and a second surge arrester which is connectable to the electric system which is to be protected. The device includes a switch connected in parallel with at least one surge arrester of the plurality of surge arresters, and the switch is adapted to be open when no overvoltage occurrence is detected and adapted to close upon overvoltage occurrence detection and short-circuit the surge arrester with which it is connected in parallel. An electric system includes at least one such device.

20 Claims, 4 Drawing Sheets

METHOD AND A DEVICE FOR OVERVOLTAGE PROTECTION, AND AN ELECTRIC SYSTEM WITH SUCH A DEVICE

TECHNICAL FIELD

The present invention relates to a method for protecting an electric system against overvoltage occurrences, the electric system being adapted to be subjected to voltages. Further, the present invention relates to a device for protecting an electric system against overvoltage occurrences, the electric system being adapted to be subjected to voltages, which device comprises a plurality of surge arresters and comprises detection means for detecting overvoltage occurrences in the electric system. The present invention also relates to an electric system comprising a device as mentioned above.

BACKGROUND OF THE INVENTION

There is a need for improved overvoltage protection for electric systems, for example electric systems including VSC-converters (VSC=Voltage Source is Converter), electric systems including line-commutated converters, and/or electric systems including power transmission lines, for example, High Voltage Direct Current (HVDC) transmission systems.

An electric system including a wind power park or wind farm is an electric system where overvoltages can be especially adverse. Conventionally, the wind turbines of an offshore wind farm are connected to a local AC bus which is connected to a first VSC-converter, a second VSC-converter is connected to an on-shore AC grid, and a DC link for transmitting the power generated by the offshore wind farm to the onshore AC grid is connected between the first and the second VSC-converter. A 3-phase fault in the AC-system on the inverter side, which includes said second VSC-converter and the AC grid, will cause high overvoltages on the rectifier side, which includes said first VSC-converter and the DC link, i.e. said first VSC-converter and the DC link will be subjected to adverse overvoltages. As a consequence, the VSC-converter on the rectifier side may not be able to receive the power produced by the wind turbines, and the wind turbines have to be brought to a standstill, and when the fault is rectified, or repaired, the wind turbines have to be started up again, and this process results in substantial fall in power production.

WO 2008/131799 A1 discloses a number of solutions to protect an electric system against overvoltages, the electric system including a wind farm and a DC link for the transmission of power from the wind farm to an AC grid, where the DC link at each end is connected to a VSC-converter. In one solution, a DC chopper, which is composed of a switchable resistor, is connected to the DC link. In another solution, the AC voltage in the local AC bus, to which the wind farm is connected, is modified by controlling the VSC-converter on the rectifier side.

It is known in prior art to use surge arresters to reduce overvoltages in an electric system in order to protect the electric system against overvoltage occurrences. For example, WO 02/50972 A1 discloses a VSC-converter for converting direct voltage into alternating voltage and vice versa, in which at least one of the current valves of the VSC-converter is provided with a circuit for overvoltage protection connected in parallel with the current valve, which circuit comprises a series connection of a surge arrester.

However, when a surge arrester is used to protect an electric system according to prior art, for example the above-mentioned electric system including the wind farm, the protective level, or the knee-point voltage, of the connected surge arrester is adapted to the electric system and set to a fixed maximum operation voltage of the electric system, and this results in an inflexible overvoltage protection.

THE OBJECT OF THE INVENTION

The object of the present invention is thus to provide an improved overvoltage protection for an electric system.

SUMMARY OF THE INVENTION

The above-mentioned object of the present invention is attained by providing a device for protecting an electric system against overvoltage occurrences, the electric system being adapted to be subjected to voltages, which device comprises a plurality of surge arresters and comprises detection means for detecting overvoltage occurrences in the electric system, wherein the surge arresters of said plurality of surge arresters are connected in series, said plurality of surge arresters comprises a first surge arrester which is connectable to ground and a second surge arrester which is connectable to the electric system which is to be protected, the device comprises a switching means connected in parallel with at least one surge arrester of said plurality of surge arresters, and the switching means is adapted to be open when no overvoltage occurrence is detected and adapted to close upon overvoltage occurrence detection and short-circuit the surge arrester with which it is connected in parallel.

According to the present invention, upon detection of overvoltages in the electric system, the switching means will short circuit the surge arrester with which it is connected in parallel, whereby energy in the electric system is "absorbed" and the overvoltages are further reduced to lower levels. Hereby, the overvoltage protection of the electric system is efficiently improved. When the device according to the present invention is applied to the electric system in the above-mentioned example involving the wind farm, the wind turbines do not have to be brought to a standstill if a corresponding fault occurs. Instead, energy is absorbed by the innovative device and the overvoltages are reduced to lower levels. The innovative device can be connected to the system at several positions, and in the detailed description of embodiments, several examples are disclosed.

When having a surge arrester which provides a fixed protective level as disclosed in the prior art, the protective level is limited by the maximum continuous operation voltage and the protective level is relatively high. This increases the wear on the surge arrester. In the solution according to the present invention, the protective level of the device is "adjusted" to a lower level upon overvoltage detection, and the electric system can continue to operate when overvoltages are detected, and the wear on the surge arrester is also reduced. The other components of the electric system can also be dimensioned to a lower protective level, which provides cost savings.

By the term "open" with regard to the switching means is meant that the switching means is in the open or non-conductive state, in which state the switching means is substantially non-conductive and does not conduct any current, and the switching means can be said to be turned off. By the term "closed" with regard to the switching means is meant that the switching means is in the closed or conductive state, in which state the switching means is conductive and conducts current, and the switching means can be said to be turned on.

Advantageously, the switching means is in the form of a fast switch, advantageously with an operate time, or closing time, of less than 2 ms, advantageously approximately 1 ms. Several suitable switching means known to the person skilled in the art can be used for the device according to the present invention, e.g. a semiconductor element of turn-off type, such as an IGBT (Insulated Gate Bipolar Transistor) or a GTO (Gate Turn-Off Thyristor), or a switching device of the type CapThor™. The detection means can be in the form of a conventional detection unit or equipment known to the skilled person. Each surge arrester, or lightning arrester, per se can be structured in various suitable ways known to the skilled person.

The plurality of surge arrester includes two or more surge arresters. According to an advantageous embodiment of the device according to the present invention, the device comprises two surge arrester units.

According to an advantageous embodiment of the device according to the present invention, the detection means comprises measuring means for measuring the voltages applied to the electric system. The measuring means can be in the form of a conventional measuring unit or equipment known to the skilled person. By this embodiment, the overvoltage protection for the electric system is further improved.

According to a further advantageous embodiment of the device according to the present invention, the device comprises control means for controlling the switching means, the control means being connected to the detection means, and the control means are adapted to control the switching means to close upon detection of overvoltage occurrence. The control means can be in the form of a control unit or control device including suitable processing means, e.g. a CPU. By this embodiment, the overvoltage protection for the electric system is further improved.

According to another advantageous embodiment of the device according to the present invention, the surge arrester, with which the switching means is connected in parallel, has a lower knee-point voltage in relation to the other surge arresters of said plurality of surge arresters. For example, the knee-point voltage of the surge arrester with which the switching means is connected could be of a normalized voltage value of 0.8 p.u. (per unit), and the other surge arrester could have a knee-point voltage of 1.0 p.u.

According to still another advantageous embodiment of the device according to the present invention, the first surge arrester has a lower knee-point voltage in relation to the second surge arrester. Tests performed by the inventors have shown that this embodiment provides an advantageous overvoltage protection.

According to yet another advantageous embodiment of the device according to the present invention, where the first surge arrester has a lower knee-point voltage in relation to the second surge arrester, the first surge arrester has a lower knee-point voltage in relation to the other surge arresters of said plurality of surge arresters. Tests performed by the inventors have shown that this embodiment provides an advantageous overvoltage protection.

According to an advantageous embodiment of the device according to the present invention, the switching means is connected in parallel with the first surge arrester. By connecting the switching means in parallel with the first surge arrester, which is connectable to ground, instead of connecting the switching means in parallel with a surge arrester situated at a higher potential, i.e. closer to the electric system, the switching means requires less insulation. By this, the switching means can be less complicated in its structure and consequently less expensive, whereby the overvoltage protection of the electric system is further improved.

The above-mentioned object of the present invention is also attained by providing a method for protecting an electric system against overvoltage occurrences, the electric system being adapted to be subjected to voltages, the method comprising the following steps: connecting a plurality of surge arresters in series; connecting a first surge arrester of said plurality of surge arresters to ground; connecting a second surge arrester of said plurality of surge arresters to the electric system; detecting overvoltage occurrences in the electric system; and when overvoltage occurrence is detected, short-circuiting at least one surge arrester of said plurality of surge arresters by means of a switching means which is connected in parallel therewith.

By the method according to the present invention, the overvoltage protection for the electric system is efficiently improved for reasons mentioned above.

According to an advantageous embodiment of the method according to the present invention, the method is characterized by keeping the switching means open when no overvoltage occurrence is detected, and by closing the switching means upon overvoltage occurrence detection to effect said short-circuiting of the surge arrester.

According to a further advantageous embodiment of the method according to the present invention, the method is characterized by short-circuiting the first surge arrester, upon overvoltage occurrence detection, by means of the switching means which is connected in parallel therewith.

According to another advantageous embodiment of the method according to the present invention, the step of detecting overvoltage occurrences comprises measuring the voltages applied to the electric system.

The positive technical effects of each of the above-mentioned embodiments of the method according to the present invention correspond to the effects mentioned above in connection with the corresponding embodiment of the device according to the present invention.

Further, the present invention provides an electric system adapted to be subjected to voltages, comprising at least one device for protecting the electric system against overvoltage occurrences, wherein said at least one device comprises the features mentioned in any of the claims 1 to 7, or the features mentioned in connection with any of the above-mentioned embodiments of the device is according to the present invention.

According to an advantageous embodiment of the electric system according to the present invention, the electric system comprises a line-commutated converter to which the device is connected, and the device is adapted to protect the line-commutated converter against overvoltage occurrences. The device can be directly connected to the line-commutated converter, or indirectly connected to the line-commutated converter, for example via a system component or unit, for example a transformer.

According to a further advantageous embodiment of the electric system according to the present invention, the electric system comprises a VSC-converter to which the device is connected, and the device is adapted to protect the VSC-converter against overvoltage occurrences. VSC stands for Voltage Source Converter. The device can be directly connected to the VSC-converter, or indirectly connected to the VSC-converter, for example via a system component or unit, for example a transformer and/or an inductor/reactor.

According to another advantageous embodiment of the electric system according to the present invention, the electric system comprises a power transmission line to which the device is connected, and the device is adapted to protect the power transmission line against overvoltage occurrences. For example, the DC link connected between a rectifier side converter and an inverter side converter is an example of a power transmission line to which the device according to present invention may be connected. The device can be directly connected to the power transmission line, or indirectly connected to the power transmission line, for example via a system component or unit.

The device according to the present invention can also be applied to other electric systems, which advantageously are used for power transmission. The electric system is advantageously adapted to be subjected to medium and/or high voltage, e.g. 10-1000 kV.

Further advantageous embodiments of the device, the method and the electric system according to the present invention and further advantages with the present invention emerge from the detailed description of embodiments.

BRIEF DESCRIPTION OF THE DRAWINGS

The present invention will now be described, for exemplary purposes, in more detail by way of embodiments and with reference to the enclosed drawings, in which.

DETAILED DESCRIPTION OF PREFERRED EMBODIMENTS

Figure 1:
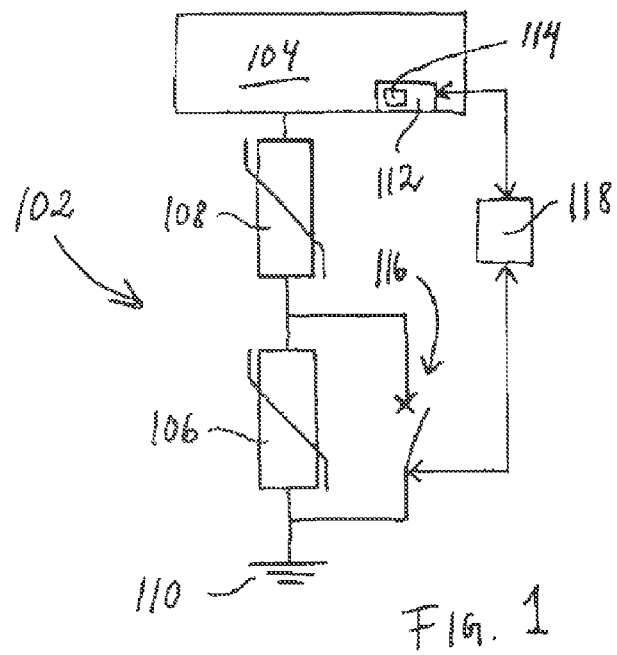
FIG. 1 is a schematic circuit diagram illustrating an embodiment of the device according to the present invention.

FIG. 1 illustrates an embodiment of the device 102 for protecting an electric system 104 against overvoltages according to the present invention, the electric system 104 being adapted to be subjected to voltages, for example voltages of 10-800 kV. The device 102 comprises two surge arresters 106, 108 which are connected in series. A first surge arrester 106 is connectable to ground 110 and a second surge arrester 108 is connectable to the electric system 104 which is to be protected. In this embodiment, the first surge arrester 106 has a knee-point voltage which is lower than that of the second surge arrester 108, for example 0.8 p.u. compared to 1.0 p.u. The device 102 may be provided with conventional connection means for connecting the device 102 to ground 110 and to the electric system 104, respectively. Each surge arrester 106, 108 of the device 102 may be of a conventional type, such as a zinc oxide surge arrester, which is also denominated MOV (Metal Oxide Varistor), and normally conducts a very low current, but when the voltage across the surge arrester 106, 108 exceeds a certain level it will conduct a substantially increased current.

The device 102 includes detection means 112 for detecting overvoltages in the electric system, and the detection means 112 may be in the form of a conventional detection unit or equipment known to the skilled person. The detection means 112 comprises measuring means 114 connectable to the electric system 104 for measuring the voltages applied to the electric system 104. The measuring means 114 may be in the form of a conventional measuring unit or equipment known to the skilled person.

The device 102 comprises a switching means 116, in the form of a fast switch, connected in parallel with the first surge arrester 106. The switching means 116 is adapted to be open when no overvoltage is detected and adapted to close upon overvoltage detection and short-circuit the first surge arrester 106 with which it is connected in parallel. Advantageously, the switching means 116 has an operate time of approximately 1 ms, and the switching means 116 can be in the form of a semiconductor element of turn-off type, such as an IGBT (Insulated Gate Bipolar Transistor) or a GTO (Gate Turn-Off Thyristor), or a switching device of the type CapThor™. However, other switching means are possible.

The device 102 comprises control means 118 for controlling the switching means 116, and the control means 118 are connected to both the detection means 112 and the switching means 116. The control means 118 are adapted to control the switching means 116 to close upon detection of overvoltages, and adapted to control the switching means 116 to open and be open when no overvoltages are detected. The control means 118 can be in the form of a control unit or control device including suitable processing means, e.g. a CPU. The device 102 may also be provided with more than two surge arresters.

Figure 2:
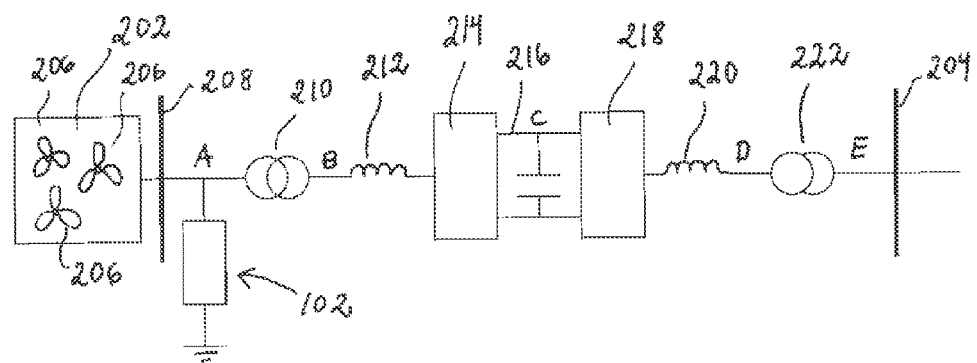
FIGS. 2-4 are schematic circuit diagrams illustrating embodiments of the electric system according to the present invention, where the electric system includes two VSC-converters.

FIG. 2 illustrates a first embodiment of the electric system according to the present invention which is adapted to be subjected to voltages, which electric system comprises a wind farm 202 connected to an AC grid 204, as it is known in prior art. The wind farm 202, which can be located offshore, includes a plurality of wind turbines 206 and is coupled to a local AC bus 208, the local AC bus 208 being connected via a first transformer 210 and a first inductor/reactor 212 to a first VSC-converter 214. The first VSC-converter 214 is connected via a DC link 216 to a second VSC-converter 218 and the VSC-converter 218 is connected via a second inductor/reactor 220 and a second transformer 222 to the AC grid 204, which can be located onshore. The first VSC-converter 214 converts AC to DC, and the second VSC-converter 218 converts DC to AC. The VSC-converters 214, 218 may be of conventional type known to the skilled person, and the function of the VSC-converters 214, 218 is well known to the person skilled in the art and is not more closely described here.

The electric system also includes a device 102 as disclosed in FIG. 1. In the electric system of FIG. 2, the device 102 is adapted to protect the first VSC-converter 214 against overvoltages. In the first embodiment of the electric system according to the present invention shown in FIG. 2, the device 102 according to the present invention is connected to the electric system on the rectifier side at the position A between the local AC bus 208 and the first transformer 210. If an AC fault occurs in the AC grid 204, the rectifier side will be subjected to overvoltages which are detected by the device 102, and in the device 102, the switching means 116 will short circuit the surge arrester 106 with which it is connected in parallel, whereby energy in the electric system is "absorbed" and the overvoltages are reduced to lower levels. Hereby, the wind turbines 206 do not have to be brought to a standstill.

Figure 3:
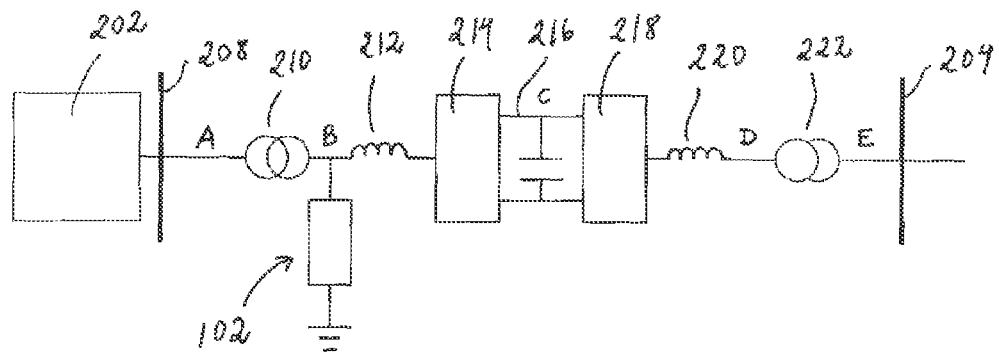

FIG. 3 illustrates a second embodiment of the electric system according to the present invention which corresponds to the electric system as illustrated in FIG. 2, but where the device 102 as disclosed in FIG. 1 is connected differently. In the second embodiment of the electric system shown in FIG. 3, the device 102 according to the present invention is instead connected to the electric system on the rectifier side at the position B between the first transformer 210 and the first inductor/reactor 212.

Figure 4:
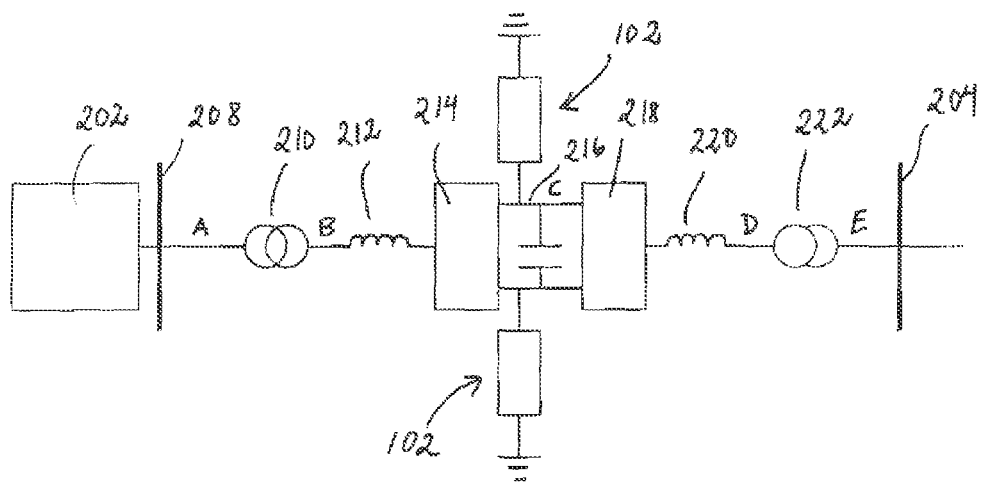

FIG. 4 illustrates a third embodiment of the electric system according to the present invention which corresponds to the electric system as illustrated in FIG. 2, but where the electric system is provided with two devices 102 as disclosed in FIG.

1 which are connected differently. In the third embodiment of the electric system shown in FIG. 4, the two devices 102 according to the present invention are connected to the DC link 216 at the position C. However, in some cases, it can be enough to connect only one device 102 to the electric system at the position C.

According to further aspects of the electric system according to the present invention, it also possible to connect the device according to the present invention to the electric system at the position D between the second inductor/reactor 220 and the second transformer 222, or at the position E between the second transformer 222 and the AC grid 204. However, other positions for the connection of the device 102 to the electric system may also be possible.

The first, second and third embodiments of the electric system as illustrated in FIGS. 2-4 can also be combined in various ways. The first embodiment of FIG. 2 can for example be supplemented with a second device 102 connected as illustrated in FIG. 3, or be supplemented with two devices 102 connected as illustrated in FIG. 4, or be supplemented with devices 102, one of which being connected as illustrated in FIG. 3, and the others being connected as illustrated in FIG. 4. The second embodiment of FIG. 3 can also be supplemented with devices 102 connected as illustrated in FIG. 4.

Figure 5:
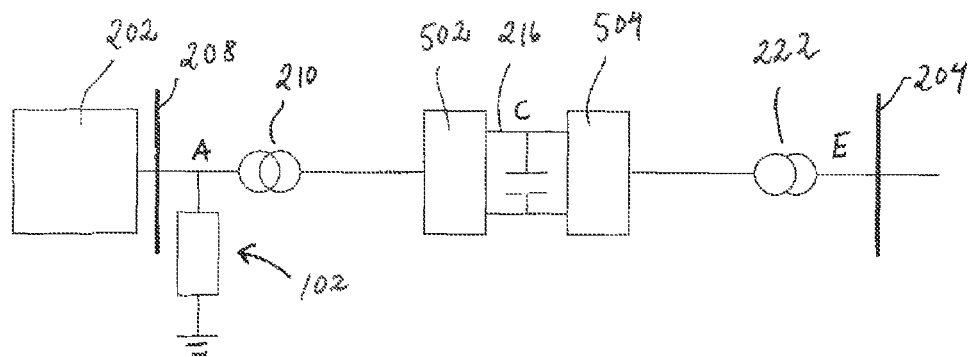
FIGS. 5-6 are schematic circuit diagrams illustrating embodiments of the electric system according to the present invention, where the electric system includes two line-commutated converters.

FIG. 5 illustrates a fourth embodiment of the electric system according to the present invention which is adapted to be subjected to voltages. The electric system of FIG. 5 corresponds to the electric system as illustrated in FIG. 2, but includes two line-commutated converters (LCC) 502, 504 instead of the two VSC-converters 214, 218, and the two inductors/reactors 212, 220 are excluded. In the electric system of FIG. 5, the device 102 as disclosed in FIG. 1 is connected to the electric system on the rectifier side at the position A between the local AC bus 208 and the first transformer 210. The LCC-converters 502, 204 may be of conventional type known to the skilled person, and the function of the LCC-converters 502, 204 is well known to the person skilled in the art and is not more closely described here.

Figure 6:
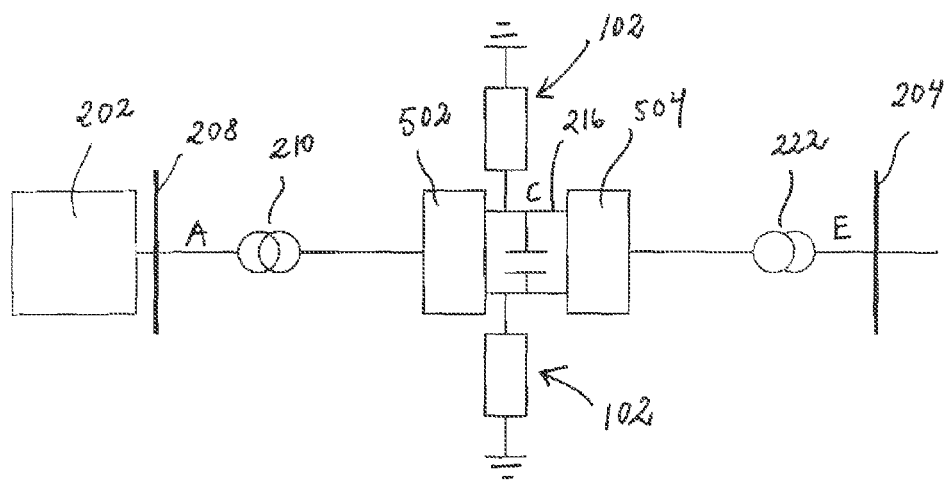

FIG. 6 illustrates a fifth embodiment of the electric system according to the present invention which corresponds to the electric system as illustrated in FIG. 5, but where the electric system is provided with two devices 102 as disclosed in FIG. 1 which are differently connected. In the fifth embodiment of the electric system shown in FIG. 5, the two devices 102 according to the present invention are connected to the DC link 206 at the position C. However, in some cases, it can be enough to connect one device 102 to the electric system at the position C.

According to further aspects of the electric system including two LCC-converters 502, 504, it also possible to connect the device according to the present invention to the electric system at the position E between the second transformer 222 and the AC grid 204. However, other positions for the connection of the device 102 may also be possible. The fourth and fifth embodiments of the electric system as illustrated in FIGS. 5-6 can also be combined, i.e. the fourth embodiment of FIG. 5 can be supplemented with devices 102 connected as illustrated in FIG. 6.

It is to be understood that further alternative connections of the device 102 to an electric system are possible, and that the device 102 can be connected to electric systems including fewer, or more, VSC-converters or LCC-converters, or to other systems without any VSC-converters or LCC-converters.

Figure 7:
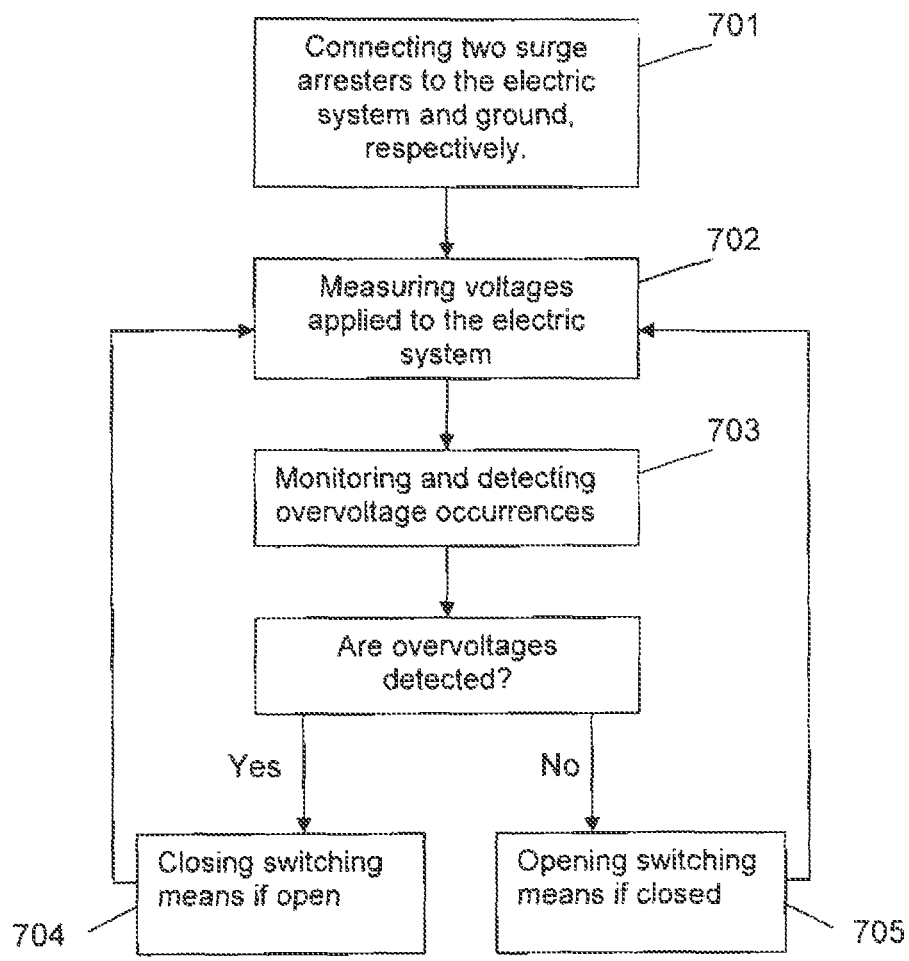
FIG. 7 is a schematic flow chart illustrating an embodiment of the method according to the present invention.

FIG. 7 shows a schematic flow chart illustrating an embodiment of the method according to the present invention, for protecting an electric system against overvoltages. The method comprising the following steps: two surge arresters are connected in series, wherein a first surge arrester of said two surge arresters is connected to ground, and a second surge arrester of said two surge arresters is connected to the electric system which is to be protected, at step 701. The voltages applied to the electric system are measured, at step 702. Overvoltage occurrences are monitored and detected, at step 703. If overvoltages are detected, i.e. if the voltages in the electric system exceed a certain level or threshold, the first surge arrester is short-circuited by means of switching means which is connected in parallel therewith, by closing the switching means if it is open, at step 704. If no overvoltages are detected, the switching means is opened if closed, at step 705.

As mentioned above, by the term "open" with regard to the switching means is meant that the switching means is in the open or non-conductive state, and by the term "closed" is meant that the switching means is in the closed or conductive state.

The invention shall not be considered limited to the embodiments illustrated, but can be modified and altered in many ways by one skilled in the art, without departing from the scope of the appended claims.

The invention claimed is:

1. A device for protecting an electric system against overvoltage occurrences, the electric system being adapted to be subjected to voltages, which device comprises a plurality of surge arresters and comprises a detector configured to detect overvoltage occurrences in the electric system, the surge arresters of said plurality of surge arresters being connected in series, and said plurality of surge arresters comprises a first surge arrester which is connectable to ground and a second surge arrester which is connectable to the electric system which is to be protected, the device comprises a switch connected in parallel with the first surge arrester, and the switch is adapted to be open when no overvoltage occurrence is detected and adapted to close upon overvoltage occurrence detection and short-circuit the first surge arrester, wherein the first surge arrester, has a lower knee-point voltage in relation to the other surge arresters of said plurality of surge arresters and a lower knee-point voltage in relation to the second surge arrester, where the knee-point value of the first surge arrester is a normalized voltage value of 0.8 p.u. and the knee-point value of the second surge arrester is a normalized voltage value of 1.0 p.u.

2. The device according to claim 1, wherein the detector comprises a measuring device configured to measure the voltages applied to the electric system.

3. The device according to claim 1, wherein the device comprises a control for controlling the switch, the control being connected to the detector, and the control is adapted to control the switch to close upon detection of overvoltage occurrence.

4. An electric system adapted to be subjected to voltages, comprising at least one device for protecting the electric system against overvoltage occurrences, wherein said at least one device comprises the device according to claim 1.

5. The electric system according to claim 4, wherein the electric system comprises a line-commutated converter to which the device is connected, and the device is adapted to protect the line-commutated converter against overvoltage occurrences.

6. The electric system according to claim 4, wherein the electric system comprises a VSC-converter to which the device is connected, and the device is adapted to protect the VSC-converter against overvoltage occurrences.

7. The electric system according to claim 4, wherein the electric system comprises a power transmission line to which the device is connected, and the device is adapted to protect the power transmission line against overvoltage occurrences.

8. The device according to claim 2, wherein the device comprises a control for controlling the switch, the control being connected to the detector, and the control is adapted to control the switch to close upon detection of overvoltage occurrence.

9. An electric system adapted to be subjected to voltages, comprising at least one device for protecting the electric system against overvoltage occurrences, wherein said at least one device comprises the device according to claim 2.

10. The electric system adapted to be subjected to voltages, comprising at least one device for protecting the electric system against overvoltage occurrences, wherein said at least one device comprises the device according to claim 3.

11. The electric system according to claim 5, wherein the electric system comprises a VSC-converter to which the device is connected, and the device is adapted to protect the VSC-converter against overvoltage occurrences.

12. The electric system according to claim 5, wherein the electric system comprises a power transmission line to which the device is connected, and the device is adapted to protect the power transmission line against overvoltage occurrences.

13. The electric system according to claim 6, wherein the electric system comprises a power transmission line to which the device is connected, and the device is adapted to protect the power transmission line against overvoltage occurrences.

14. A method for protecting an electric system against overvoltage occurrences, the electric system being adapted to be subjected to voltages, the method comprising the steps of:
   connecting a plurality of surge arresters in series;
   connecting a first surge arrester of said plurality of surge arresters to ground;
   connecting a second surge arrester of said plurality of surge arresters to the electric system;
   detecting overvoltage occurrences in the electric system; and
   when overvoltage occurrence is detected, short-circuiting the first surge arrester by means of a switch which is connected in parallel therewith, wherein the first surge arrester, has a lower knee-point voltage in relation to the other surge arresters of said plurality of surge arresters, has a lower knee-point voltage in relation to the second surge arrester, with the knee-point value of the first surge arrester being a normalized voltage value of 0.8 p.u. and the knee-point value of the second surge arrester being a normalized voltage value of 1.0 p.u.

15. The method according to claim 14, further comprising the steps of keeping the switch open when no overvoltage occurrence is detected, and closing the switch upon overvoltage occurrence detection to effect said short-circuiting of the surge arrester.

16. The method according to claim 14, further comprising the step of short-circuiting the first surge arrester, upon overvoltage occurrence detection, by means of the switching means which is connected in parallel therewith.

17. The method according to claim 14, wherein the step of detecting overvoltage occurrences comprises measuring the voltages applied to the electric system.

18. The method according to claim 15, further comprising the step of short-circuiting the first surge arrester, upon overvoltage occurrence detection, by means of the switching means which is connected in parallel therewith.

19. The method according to claim 15, wherein the step of detecting overvoltage occurrences comprises measuring the voltages applied to the electric system.

20. The method according to claim 16, wherein the step of detecting overvoltage occurrences comprises measuring the voltages applied to the electric system.

* * * * *